United States Patent Office 3,132,174
Patented May 5, 1964

3,132,174
γ-AMINO - γ - CYANOPROPYLSULFONIC ACID SALTS AND METHOD FOR MAKING HOMOCYSTEIC ACID
Takeo Kaneko, Osaka-shi, Osaka-fu, and Ryonosuke Yoshida, Suita-shi, Osaka-fu, Japan, assignors to Ajinomoto Kabushiki Kaisha, Tokyo, Japan, a corporation of Japan
No Drawing. Filed July 26, 1961, Ser. No. 126,856
Claims priority, application Japan Aug. 1, 1960
8 Claims. (Cl. 260—465.5)

This invention relates to processes for producing homocysteic acid which comprise producing alkali salts of γ-amino-γ-cyanopropylsulfonic acid by the reaction of acrolein, alkali bisulfite, hydrogen cyanide or salts thereof and ammonia or salts thereof in an aqueous solution, and then hydrolyzing said product by means of a conventional method.

It is an object of this invention to obtain homocysteic acid in a simple and economical way.

In relation to studies of the physical properties of and interrelation between the flavoring effects and the chemical and configurational structures of amino acids, we have discovered for the first time that the taste of monosodium L-homocysteate is similar to that of monosodium L-glutamate and that monosodium L-homocysteate has a superior flavoring effect.

L. W. Butz and V. de Vigneaud have indicated in J. Biol. Chem., 99, 135 (1932–3) that homocysteic acid can be obtained by the oxidation of homocystine with the use of bromine. However, there is little description of the physical properties of this product other than with respect to its melting point. Various methods for producing homocystine have also been previously disclosed, but none of these is simple in practice.

This invention proposes a remarkably superior method in that raw materials such as homocystine which is difficult to synthesize or bromine which is troublesome to handle are not needed and in that acrolein, alkali bisulfite, hydrogen cyanide or salts thereof and ammonia or salts thereof which are commercially available are used as the main raw materials and in that the desired product can be obtained by the simplest of processes.

In this invention sodium or potassium γ-amino-γ-cyanopropylsulfonate as the precursor of homocysteic acid is, at the first stage, prepared by reacting acrolein, sodium or potassium bisulfite, hydrogen cyanide or salts thereof and ammonia or salts thereof in an aqueous solution.

We have now found that the reactivity of hydrogen cyanide to the aldehyde group of the acrolein molecule is stronger than that of sodium or potassium bisulfite, and that sodium or potassium bisulfite at first adds to the aldehyde group and then to the double bond when acrolein is reacted with sodium bisulfite.

This conclusion is based on the following:

(1) Homocysteic acid was produced when 2 mols of sodium or potassium bisulfite were added to one mol of acrolein, and the reaction mixture then treated with hydrogen cyanide and ammonia, and the product thus obtained was hydrolyzed.

(2) The equimolar addition product of acrolein and sodium bisulfite did not show an infra-red absorption spectrum corresponding to an aldehyde group. Evolution of sulfur dioxide was observed when this addition product was treated with sulfuric acid. A black resinous material was produced, but homocysteic acid was not found in the product, according to a paper chromatography determination, when said addition product was reacted with hydrogen cyanide and ammonia and the thus obtained product was then hydrolyzed.

(3) Homocysteic acid was produced when acrolein was reacted with hydrogen cyanide to give acrolein cyanohydrin, which was treated with sodium or potassium bisulfite followed by aminating and hydrolyzing steps.

(4) α-Hydroxy-γ-sulfoamidebutyramide was obtained when acrolein was reacted with an aqueous solution of equimolar amounts of hydrogen cyanide and sodium bisulfite, the product thereof being hydrolyzed, the carboxyl group being esterified with methanolic hydrochloric acid, and the product being chlorinated with phosphorous pentachloride to give γ-chloro-γ-methoxycarbonyl-propylsulfochloride, and being treated with ammonia.

(5) Homocysteic acid was produced by reacting acrolein with an aqueous solution containing hydrogen cyanide and sodium or potassium bisulfite in the molar ratio of 1:1, then aminating and hydrolyzing the product.

(6) Homocysteic acid was produced by reacting acrolein with an aqueous solution containing ammonium cyanide and reacting the product with an equimolar amount of sodium bisulfite to the acrolein used, and then hydrolyzing the product.

The difference between the reactivity of acrolein with sodium or potassium bisulfite and that with hydrogen cyanide became apparent based on the above stated experimental results.

From considerations of the molar ratio and the order of addition of the reactants, we have found that the molar ratio of the reactants has an optimum value for producing homocysteic acid depending on the order of addition of alkali bisulfite and hydrogen cyanide or salts thereof to acrolein. That is:

(1) When alkali bisulfite is reacted with hydrogen cyanide or salts thereof and acrolein at the same time, or alkali bisulfite is reacted with acrolein after the addition of hydrogen cyanide or salts thereof, the required amount of alkali bisulfite is minimum. Thus, in this case, the molar ratio of acrolein, alkali bisulfite and hydrogen cyanide have a value of approximately 1:1:1. Sulfite was not found as a by-product in the reaction mixture.

(2) When alkali bisulfite is reacted with acrolein prior to hydrogen cyanide or salts thereof, 2 mols of alkali bisulfite are needed per mol of acrolein to convert acrolein completely into the intermediate of this reaction. In this case disodium or dipotassium 1-hydroxy-3-sulfopropylsulfonate, an addition product of 1 mol of acrolein and 2 mols of sodium bisulfite can be readily isolated. This addition product can be converted, after isolation, into the corresponding aminonitrile in pure state by reaction with hydrogen cyanide or salts thereof and ammonia or salts thereof. Said aminonitrile, i.e., γ-amino-γ-cyanopropylsulfonic acid, a new compound, was first synthesized and isolated by us.

Of course, it is possible to obtain the aminonitrile without isolating the above disodium or dipotassium salt. In this case, the molar ratio of acrolein, alkali bisulfite and hydrogen cyanide is 1:2:1.

Ammonia or salts thereof may be added at a convenient time. Although the amount of ammonia required is theoretically 1 mol per mol of acrolein, it is desirable to use ammonia in excess of 0–8 mols of the stoichiometric amount. More ammonia is consumed uselessly.

Hydrolysis can be carried out with or without isolation of the intermediate, i.e., sodium or potassium γ-amino-γ-cyanopropylsulfonate which is obtained by reacting acrolein, sodium or potassium bisulfite, hydrogen cyanide or salts thereof and ammonia or salts thereof. Hydrolysis can be carried out with conventional methods, e.g., the reaction mixture containing alkali γ-amino-γ-cyanopropylsulfonate is refluxed with a mineral acid such as hydrochloric or sulfuric acid or a base such as sodium or barium hydroxide.

The desired product, homocysteic acid, can be isolated by conventional methods, e.g., by concentrating the hydrolyzate and filtering off the precipitated inorganic salts, and finally said product contained in the filtrate is adsorbed on an ion exchange resin and then eluted therefrom.

Example 1

5.6 g. (0.1 mol) of freshly distilled acrolein were added dropwise to a suspension of 20.4 g. (0.2 mol) of sodium bisulfite in 30 ml. of water at 10–15° C. The mixture was stirred for an additional 30 minutes, and was concentrated carefully under reduced pressure. White crystals were obtained. These crystals were washed with 99% alcohol and dried. 29 g. of crystals were obtained having a melting point of 115–118° C.

A solution of 5.4 g. (0.11 mol) of sodium cyanide in 20 ml. of water was added dropwise to a solution of 29 g. of disodium 1-hydroxy-3-sulfopropylsulfonate obtained in the foregoing way in about 30 ml. of water so that the temperature of the reaction mixture raised. After a stirring of 1.5 hours, crystals of sodium sulfite were precipitated on cooling. These crystals were filtered off, and the filtrate was allowed to stand for 20 hours at room temperature after the addition of 50 ml. of aqueous concentrated ammonia. The reaction mixture was first neutralized with concentrated hydrochloric acid, 100 ml. of said acid being added, and refluxed for 3 hours to hydrolyze. The resulting hydrolyzate was concentrated in vacuo and the precipitated inorganic salts were filtered off. The filtrate had water added thereto and was concentrated to a syrup in order to remove hydrochloric acid and water. The syrup was dissolved in water and treated with decolorizing charcoal, and was passed through a column (3 cm. in diameter and 30 cm. in height) of an ion exchange resin "Dowex 50" (H form), and the combined fractions of effluent of pH=1 were concentrated to give a syrup from which crystals were obtained by the adding of alcohol.

These crystals were collected and washed with alcohol. The yield was 9 g. (about 50%). These crystals melted at 265–266° C. (dec.) and the melting point was unchanged by recrystallization from water-alcohol. The results of elementary analysis will be given below. The infra-red absorption spectrum was completely identical with that of homocysteic acid prepared by oxidation of DL-homocystine. Accordingly, the crystals obtained in this example were found to be homocysteic acid.

*Analysis.*—Calculated for $C_4H_9O_5NS$: C, 26.23%; H, 4.95%; N, 7.65%; S, 17.50%. Found: C, 26.59%; H, 5.02%; N, 7.54%; S, 17.32%.

Example 2

22.4 g. (0.4 mol) of acrolein were added dropwise with stirring to a suspension of 81.6 g. (0.8 mol) of sodium bisulfite in 120 ml. of water at 10–15° C. The reaction mixture became clear. After a stirring for an additional 30 minutes, a solution of 29 g. (about 0.6 mol) of sodium cyanide in 120 ml. of water was added dropwise to this reaction mixture, and the temperature of the reaction mixture was raised. The mixture was cooled after stirring for 1.5 hours, and the precipitated sodium sulfite was filtered off. About 200 ml. of aqueous concentrated ammonia were added to the resulting filtrate, and allowed to stand for 20 hours at room temperature. The reaction mixture which contained sodium γ-amino-γ-cyanopropylsulfonate was treated in the same manner as described in Example 1. 44 g. of the desired product (yield was about 60%) were obtained.

Example 3

5.4 g. of sodium cyanide, 10.2 g. of sodium bisulfite and 5.8 g. of ammonium chloride were dissolved in 20 ml. of water respectively and the solution was mixed. 5.6 g. of acrolein were added dropwise with stirring to the mixed solution under cooling conditions at −5° C., and the stirring was continued for an additional 3 hours. A small amount of insoluble materials was filtered, and then 50 ml. of aqueous concentrated ammonia were added to reaction mixture, and it was kept at room temperature for a week. After filtration the reaction mixture was concentrated to a syrup in vacuo at 30–40° C. 200 ml. of dimethylformamide were added to the syrup, the deposited crystals were filtered off, and when ether was added to the filtrate oily matter was precipitated. The oily matter was removed and the mother liquor was concentrated in vacuo and the residue was dissolved in water. The solution was passed through a column (2.5 cm. in diameter and 25 cm. in height) of an ion exchange resin "Diaion SK #1," and the combined acidic fractions were concentrated under reduced pressure. The crystals precipitated out from the concentrate were washed with alcohol and acetone. The yield of γ-amino-γ-cyanopropylsulfonic acid was 4 g.

A solution of 1.5 g. of crude γ-amino-γ-cyanopropylsulfonic acid in 30 ml. of water was treated with active charcoal and then 60 ml. of alcohol were added to give pure crystals of γ-amino-γ-cyanopropylsulfonic acid.

An analytically pure sample was obtained by repeated recrystallization from water-alcohol. This product melted at 217–219° C. (dec.).

*Analysis.*—Calculated for $C_4H_8O_3N_2S$: C, 29.27%; H, 4.91%; N, 17.07%; S, 19.53%. Found: C, 29.36%; H, 5.04%; N, 17.58%; S, 19.76%.

Example 4

Solutions of 5.4 g. of sodium cyanide, 10.2 g. of sodium bisulfite and 5.8 g. of ammonium chloride in 20 ml. of water were mixed together. The combined solution was chilled at −5° C. and 5.6 g. of acrolein were added thereto in portions with a vigorous stirring. After 2 hours' additional stirring, a small amount of insoluble substance was removed by filtration and 50 ml. of aqueous ammonia were added to the filtrate which was then allowed to stand overnight. The reaction mixture was concentrated in vacuo to a syrupy residue. The syrup was dissolved in water and passed through a column (2.5 cm. in diameter and 30 cm. in height) of a cation exchange resin "Dowex 50" of $NH_4^+$ type and a column of the same diameter and height of "Dowex 50" of H type, and then the acidic fractions were collected. The collected fractions were concentrated to syrup in vacuo, and 100 ml. of methanol were added to the concentrate to give crystals of γ-amino-γ-cyanopropylsulfonic acid. Yield 9.7 g., M.P. 205–210° (dec.). The product was recrystallized from water-alcohol.

(a) 1.2 g. of amino nitrile obtained above was boiled with 50 ml. of 20% hydrochloric acid for 5 hours, and concentrated under reduced pressure to remove the excessive hydrochloric acid. The residue was dissolved in water, and passed through a column (2 cm. in diameter and 25 cm. in height) of cation exchange resin "Diaion SK #1" and acidic fractions were collected. The combined acidic fractions were treated with active charcoal and concentrated under reduced pressure (1.1 g. of crystalline homocysteic acid was obtained) by adding alcohol to the concentrate.

1 g. of these crystals was dissolved in 10 ml. of water, and after evaporation 0.7 g. of homocysteic acid was obtained by addition of alcohol. The crystals which were considered to be of the polymorphic form had a M.P. of 257–258° C. (dec.).

*Analysis.*—Calculated for $C_4H_9O_5NS$: C, 26.23%; H, 4.95%; N, 7.65%; S, 17.50%. Found: C, 26.25%; H, 5.08%; N, 7.59%; S, 17.00%. pKa', 2.25, 9.50.

Paper chromatography of the product described above had the same Rf value as an authentic sample of homocysteic acid.

When a solution of 0.3 g. of the product obtained above in 1 ml. of water was seeded with the crystals of the more stable form of homocysteic acid, and 10 ml. of alcohol added to the solution, 0.3 g. of the crystals of more stable form were precipitated out from the solution. They melted at 267–268° C. (dec.), and the infra-red absorption spectrum was absolutely identical with that of the more stable crystals of homocysteic acid.

(b) 3.4 g. of γ-amino-γ-cyanopropylsulfonic acid (0.02 mol) were hydrolyzed with 36 mol of 5% aqueous sodium hydroxide solution for 5 hours under gentle refluxing. Homocysteic acid was isolated by passage through a column (2.5 cm. in diameter and 20 cm. in height) of cation exchange resin "Diaion SK #1." The product has a M.P. of 250–263° (dec.), and a yield of 2.3 g. (62.1%). Recrystallization was effected with water-alcohol. The infra-red absorption spectrum of the thus obtained homocysteic acid was absolutely identical with that of authentic homocysteic acid.

(c) 7 g. (0.021 mol) of barium hydroxide were added to a solution of 3.4 g. (0.02 mol) of γ-amino-γ-cyanopropylsulfonic acid in 100 ml. of water and then the mixture was refluxed for 6 hours. Homocysteic acid was obtained from the filtrate after removal of barium ions by the addition of Dry Ice and sulfuric acid, followed by evaporation in vacuo. The product had an M.P. of 240–242° (dec.), and a yield of 2.3 g. (62.1%). Recrystallization was effected with water-alcohol.

Example 5

Solutions of 5.4 g. (0.11 mol) of sodium cyanide, 10.2 g. (0.1 mol) of sodium bisulfite and 6.4 g. (0.12 mol) of ammonium chloride in 20 ml. of water were mixed. 5.6 g. (0.1 mol) of acrolein were added dropwise to the mixture with stirring at 0–2° C. over a period of 30 minutes, and the stirring was continued at room temperature for an additional 30 minutes. To the reaction mixture, 50 ml. of the conc. aqueous ammonia were added, and then the mixture was allowed to stand for 3 days at room temperature. The reaction mixture was neutralized by concentrated hydrochloric acid, and was hydrolyzed by boiling for 5 hours after the addition of 100 ml. of concentrated hydrochloric acid. The hydrolyzate was concentrated under reduced pressure, the precipitated inorganic salts were filtered off, and the concentrate was evaporated to dryness under reduced pressure. The addition of water followed by evaporation was repeated several times to remove the excess of hydrochloric acid.

The aqueous solution of the residue was passed through a column (3 cm. in diameter and 25 cm. in height) of a cation exchange resin "Diaion SK #1" and the fractions of pH=1 were collected. 13.4 g. of the crude crystals of homocysteic acid were obtained from the combined fractions after concentration in vacuo followed by the addition of alcohol. Yield 13.4 g. (73.2%), M.P. 232–235° C. (dec.).

9.5 g. of crystalline homocysteic acid were obtained by recrystallization of the crude crystals from water-alcohol. The purified crystals melted at 265–266° C. (dec.). The elementary analysis was as below and the infra-red absorption spectrum and paper chromatogram were identical with those of an authentic sample of homocysteic acid prepared by oxidation of DL-homocystine using bromine.

*Analysis.*—Calculated for $C_4H_9O_5NS$: C, 26.23%; H, 4.95%; N, 7.65%. Found: C, 26.44%; H, 5.06%; N, 7.02%.

Example 6

5.4 g. (0.1 mol) of sodium cyanide and 5.8 g. (0.11 mol) of ammonium chloride were dissolved in 40 ml. of water. 5.6 g. (0.1 mol) of acrolein were added dropwise to the solution with stirring at −5° C., and the stirring was continued for an additional 20 minutes. A solution of 10.2 g. (0.1 mol) of sodium bisulfite in 20 ml. of water was then added dropwise to the solution. The solution was stirred for an additional 30 minutes. A small amount of insoluble substance was filtered off and 50 ml. of aqueous concentrated ammonia were added to the filtrate and the solution was allowed to stand for 2 days at room temperature. 5 g. of homocysteic acid were obtained by the treatment described in Example 1.

Example 7

5.4 g. of sodium cyanide, 10.2 g. of sodium bisulfate and 5.8 g. of ammonium chloride were separately dissolved in 20 ml. of water and the resulting solutions were mixed together. To the mixed solution were added dropwise, 5.6 g. of acrolein with stirring at 20° C. A small amount of the insoluble substance therein was filtered off after an additional 1 hour's stirring at 30° C. to the filtrate were added 50 ml. of aqueous concentrated ammonia and the resulting solution was refluxed with 200 ml. of water and 24 g. of barium hydroxide and left to stand for 25 hours. The excessive barium hydroxide was converted with Dry Ice to barium carbonate and the latter was filtered off. The filtrate was adjusted to a pH of 1 and the resulting precipitate of barium sulfate was filtered off. The filtrate was passed through a column (2.5 cm. in diameter and 30 cm. in height) of an ion exchange resin "Diaion SK #1" of H form. The acidic effluent was concentrated to syrup under reduced pressure. Crystals formed when the residue was added with alcohol. Yield 5 g., M.P. 260–263° C. (dec.).

The paper chromatogram and infra-red absorption spectrum of said crystals were, respectively, identical with those of an authentic sample of homocysteic acid.

Example 8

13.0 g. of crude crystalline homocysteic acid were obtained in the same way as described in Example 5 except 0.1 mol of potassium bisulfite was used instead of 0.1 mol of sodium bisulfite.

What we claim is:

1. A process for producing homocysteic acid which comprises reacting a compound selected from the group consisting of hydrogen cyanide, sodium cyanide, potassium cyanide and ammonium cyanide, a compound selected from the group consisting of ammonia, ammonium chloride and ammonium cyanide; acrolein and alkali bisulfite with one another in an aqueous solution, hydrolyzing the thusly formed reaction substance to form a hydrolyzate and recovering homocysteic acid from said hydrolyzate.

2. A process for producing homocysteic acid which comprises reacting a compound selected from the group consisting of ammonia and ammonium chloride, and one of the group consisting of sodium and potassium cyanides with disodium 1-hydroxy-3-sulfopropylsulfonate, hydrolyzing the thrusly formed reaction substance to form a hydrolyzate and recovering homocysteic acid from said hydrolyzate.

3. A process for producing homocysteic acid which comprises reacting ammonium cyanide with disodium 1-hydroxy-3-sulfopropylsulfonate, to form sodium γ-amino-γ-cyanopropylsulfonate, hydrolyzing the thusly formed reaction substance to form a hydrolyzate and recovering homocysteic acid from said hydrolyzate.

4. Alkali metal γ-amino-γ-cyanopropylsulfonate.
5. Sodium γ-amino-γ-cyanopropylsulfonate.
6. Potassium γ-amino-γ-cyanopropylsulfonate.
7. Ammonium γ-amino-γ-cyanopropylsulfonate.
8. γ-amino-γ-cyanopropylsulfonic acid.

References Cited in the file of this patent
UNITED STATES PATENTS

| | | |
|---|---|---|
| 2,312,878 | Carpenter | Mar. 2, 1943 |
| 2,346,547 | Alderson | Apr. 11, 1944 |